United States Patent
Botti

(10) Patent No.: US 10,759,486 B2
(45) Date of Patent: Sep. 1, 2020

(54) THREE OR FOUR WHEELED HUMAN POWERED VEHICLE WITH DUAL WHEEL FRONT STEERING AND SINGLE OR DUAL WHEEL REAR DRIVE

(71) Applicant: Frank Louis Botti, Antioch, CA (US)

(72) Inventor: Frank Louis Botti, Antioch, CA (US)

( * ) Notice: Subject to any disclaimer, the term of this patent is extended or adjusted under 35 U.S.C. 154(b) by 132 days.

(21) Appl. No.: 15/990,612

(22) Filed: May 26, 2018

(65) Prior Publication Data
US 2018/0346050 A1    Dec. 6, 2018

Related U.S. Application Data

(60) Provisional application No. 62/514,725, filed on Jun. 2, 2017.

(51) Int. Cl.
*B62K 5/05*    (2013.01)
*B62K 5/06*    (2006.01)
*B62K 3/02*    (2006.01)

(52) U.S. Cl.
CPC ............... *B62K 5/05* (2013.01); *B62K 3/02* (2013.01); *B62K 5/06* (2013.01); *B60L 2200/12* (2013.01)

(58) Field of Classification Search
CPC ... B62K 5/00; B62K 5/02; B62K 5/05; B62K 5/08; B62K 5/06; B62K 9/02
See application file for complete search history.

(56) References Cited

U.S. PATENT DOCUMENTS

| | | | | |
|---|---|---|---|---|
| 3,447,623 A * | 6/1969 | Hott | ............... | B62K 5/027 |
| | | | | 180/210 |
| 4,277,078 A * | 7/1981 | Root | ............... | B62K 5/05 |
| | | | | 280/269 |
| 4,351,410 A * | 9/1982 | Townsend | ........ | B62D 9/02 |
| | | | | 180/210 |
| 4,634,137 A * | 1/1987 | Cocksedge | ....... | B62K 5/05 |
| | | | | 280/256 |
| 4,740,004 A * | 4/1988 | McMullen | ........ | B62K 5/05 |
| | | | | 280/124.103 |
| 4,863,183 A * | 9/1989 | Hwang | ............ | B62K 5/05 |
| | | | | 280/267 |
| 5,116,071 A * | 5/1992 | Calfee | ............. | B62K 19/18 |
| | | | | 264/258 |
| 6,817,617 B2 * | 11/2004 | Hayashi | ........... | B62K 5/05 |
| | | | | 280/124.1 |

(Continued)

*Primary Examiner* — Michael McCullough

(57) ABSTRACT

A human powered vehicle comprises a dual wheel front steering, a single or dual wheel rear drive, three or four wheels, a strong lightweight frame assembly, a steering system, two pedals, and a crank and chain transfer drive system. A driver is seated in an upright position for maximum ergonomic efficiency and minimum propulsion effort. Said position also provides for easy mounting and dismounting on to and off of the vehicle. The steering system is completely adjustable and incorporates Ackermann steering geometry to reduce wheel turning scrub and preserve forward momentum. The invention is further configured with components that can be adapted to various manual drive systems, multiple gear ratio drive mechanisms, or power drive system such as an electric motor or similar device. The invention is more easily operated by children, elderly, and the handicapped than bicycles, traditional tricycles, and other three-wheeled human powered vehicles.

12 Claims, 10 Drawing Sheets

(56) References Cited

U.S. PATENT DOCUMENTS

| | | | | |
|---|---|---|---|---|
| 6,953,203 | B2 * | 10/2005 | Wilcox | B62K 3/005 |
| | | | | 280/282 |
| 7,703,788 | B2 * | 4/2010 | Tanouye | B62K 25/30 |
| | | | | 280/284 |
| 7,708,291 | B1 * | 5/2010 | Henderson | B62D 9/02 |
| | | | | 280/124.103 |
| 8,016,302 | B1 * | 9/2011 | Reeve | B62K 5/05 |
| | | | | 280/124.103 |
| 9,174,693 | B2 * | 11/2015 | Godlewski | B62K 9/02 |
| 9,284,010 | B2 * | 3/2016 | Kump | B62K 19/02 |
| 9,394,027 | B2 * | 7/2016 | Serpa | B62K 5/05 |
| 9,469,362 | B1 * | 10/2016 | Edmonds | B62K 19/06 |
| 2006/0226628 | A1 * | 10/2006 | Lindsay | A61G 5/023 |
| | | | | 280/250 |

* cited by examiner

THREE OR FOUR WHEELED HUMAN POWERED VEHICLE WITH DUAL WHEEL FRONT STEERING AND SINGLE OR DUAL WHEEL REAR DRIVE

CROSS-REFERENCE TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

Field of the Invention

Technical Field

The present invention is in the technical field of three or four wheeled human powered vehicles. More particularly, the present invention is in the technical field of three or four wheeled, dual wheel front steering, single or dual wheel rear drive, human powered vehicles.

General Background

Cycles, particularly bicycles, have been the subject of continuous engineering development from the days of the two-wheeled push bike in 1816 by Baron von Drais in Karlsruhe, Germany, with his "lauf maschine", to the first pedal-operated bike by Scotsman Kirkpatrick MacMillan in 1839, to Pierre Lallement's "boneshaker", a crank bicycle of the 1860's, to today's racing bikes, mountain bikes, and beach cruisers. The mechanical system of the bicycle, that is, the pedal, crank and chain transfer system to the rear wheel gears has been estimated to be 92-95% efficient in transferring energy from the human operator to the rear wheel. Because of its numerous attributes, the bicycle has enjoyed widespread popularity. Due to the balance requirements inherent in riding a bicycle, bicycles do pose problems for drives who wish to remain upright when stopped, drivers who wish to carry large, heavy or awkward loads, and to children, elderly, and the handicapped.

Tricycles, on the other hand, eliminate the balancing issue inherent in the bicycle design. Tricycles remain upright when stopped, can carry large, heavy or awkward loads easily, and are more easily operated by children, elderly, and the handicapped. However, tricycles have enjoyed much less popularity than bicycles for the numerous reasons. First, the pedal mechanism and positioning on a tricycle is typically much less efficient than that of a bicycle. Second, the conventional single front wheel, dual rear wheel, tricycle has poor dynamic lateral stability. The driver must take care when cornering to avoid tipping the tricycle over. Third, conventional tricycles do not have the advantages of good handling characteristics evidenced by bicycles in which the driver can maneuver easily with the front steering and pedal the rear wheels. These and other factors have relegated the tricycle to primarily children's play vehicles.

Description of the Related Art

Traditional tricycles and other three-wheeled human powered vehicles typically are configured with one front wheel and two rear wheels. Although this configuration allows the driver to remain upright when stopped, traditional tricycles are inherently unstable when negotiating turns. Additionally, traditional tricycles and other three-wheeled human powered vehicles typically utilize the front wheel to drive the vehicle. A front wheel drive tricycle results in excessive loss of traction and slipping of the drive wheel. Further, traditional tricycles and many three-wheeled human powered vehicles have crank assembly that are attached to the front wheel of the vehicle, the same wheel that steers the vehicle. When a traditional tricycle is turned the crank assembly and pedals are also turned resulting in an inefficient pedal position.

A traditional tricycle and other three-wheeled human powered vehicles position the driver in a seated or semi-seated position in which the legs of the driver are extended in front of the driver's hips and torso. A seated or semi-seated position does not allow the driver to efficiently apply force to the pedals of the vehicle. The driver must hold himself into position, rely on his body weight, or utilize a seat back to counter the force he applies to the pedals.

Further, the front wheel drive configuration of a traditional tricycle requires a complex device to incorporate a multiple gear ratio drive mechanism. Therefore, there are few if any traditional tricycle that offer multiple gear ratio drive mechanism. Thus, the gearing of a traditional tricycle cannot be optimized for maximum speed and acceleration.

Finally, also due to the front wheel drive configuration, it is difficult to fit a traditional tricycle with an electric drive unit. Therefore, there are few if any traditional tricycle that offer electric drive unit.

SUMMARY OF THE INVENTION

The main purpose of the present invention is to provide a three or four wheeled human powered vehicle which will be novel in construction and extremely stable operation. The present invention is a dual wheel front steering, single or dual wheel rear drive, human powered vehicle in which the driver is seated in an upright position for maximum ergonomic efficiency and minimum propulsion effort. The present invention positions the driver to provide for easy mounting and dismounting on to and off of the vehicle. The present invention utilizes a novel strong lightweight frame assembly that allows for two front fork assemblies attached to a novel steering system. The steering system of the present invention is fully adjustable and incorporates Ackermann steering geometry to reduce wheel turning scrub and preserve forward momentum. The frame assembly of the present invention also provides for a pedal, crank and chain transfer system to the rear wheel gears of the vehicle.

Another object of this invention is to provide a three or four wheeled human powered vehicle which will have a novel frame assembly with a center head tube and right and left outer head tubes. The right and left outer head tubes are connected to center head tube via cantilever tubes which are gusseted for strength.

Another object of this invention is to provide a three or four wheeled human powered vehicle which will have a pair of parallel front fork assemblies riding in the outer head tubes of the frame assembly and center mounted handlebars riding in the center head tube of the frame assembly. The handlebars are connected to the fork assemblies via a novel steering system.

Another object of this invention is to provide a novel steering system with a novel stem/pitman arm which attaches to the handlebars and to a novel center steerer tube which rides in the center head tube of the frame assembly.

Another object of this invention is to provide a novel steering system with novel steering arms which attach to the steerer tubes of the fork assemblies and ride in the outer head tubes of the frame assembly.

Another object of this invention is to provide a novel steering system with a novel steering shaft which connects the stem/pitman arm to the steering arms and incorporates Ackermann steering geometry and anti-bind features.

Another object of this invention is to provide a three or four wheeled human powered vehicle which is easily fitted with various manual drive systems and/or multiple gear ratio drive unit.

Another object of this invention is to provide a three or four wheeled human powered vehicle which is easily fitted with an electric drive units or similar device.

Another object of this invention is to provide a three or four wheeled human powered vehicle which is easily adapted for use by the handicapped.

Another object of this invention is to provide a novel vehicle which will allow the driver at any speed to maintain his balance as he would with an ordinary bicycle and will allow the driver to have more self-confidence and mechanical stability when stopped or driving slowly, driving with a load, driving while towing, driving with a passenger, or driving in a highly congested area.

Other objects of the present invention are to provide a three or four wheeled human powered vehicle which is simple in design, inexpensive to manufacture, rugged in construction, easy to use and efficient in operation.

These and other objects will be readily evident upon a study of the following specification together with the accompanying drawings wherein:

REFERENCE NUMERALS IN THE DRAWINGS

| | |
|---|---|
| 1. | Frame Assembly |
| 2. | Stem/Pitman Arm |
| 3. | Handlebars |
| 4. | Steering Arm |
| 5. | Steering Shaft |
| 6. | Fork Assembly |
| 7. | Front Wheel |
| 8. | Pedals |
| 9. | Crank Assembly |
| 10. | Rear Wheel |
| 11. | Seat |
| 12. | Outer Head Tube |
| 13. | Cantilever Tubes |
| 14. | Center Head Tube |
| 15. | Head Tube Gusset |
| 16. | Top Tube |
| 17. | Seat Tube |
| 18. | Seat Stay |
| 19. | Dropouts |
| 20. | Chain Stays |
| 21. | Bottom-Bracket Shell |
| 22. | Down Tube |
| 23. | Yoke |
| 24. | Cantilever Tube Gussets |
| 25. | Steerer Tube Locknut |
| 26. | Headset |
| 27. | Wedge Bolt |
| 28. | Wedge |
| 29. | Steerer Tube |
| 30. | Steering Shaft Pin |
| 31. | Rear Drive Gear |
| 32. | Center Steering Assembly |
| 33. | Outer Steering Assembly |
| 201. | Pinch Nut and Bolt |
| 202. | Pillow Block |
| 203. | Pillow Block Nut and Bolt |

DETAILED DESCRIPTION OF THE INVENTION

Figure 1:
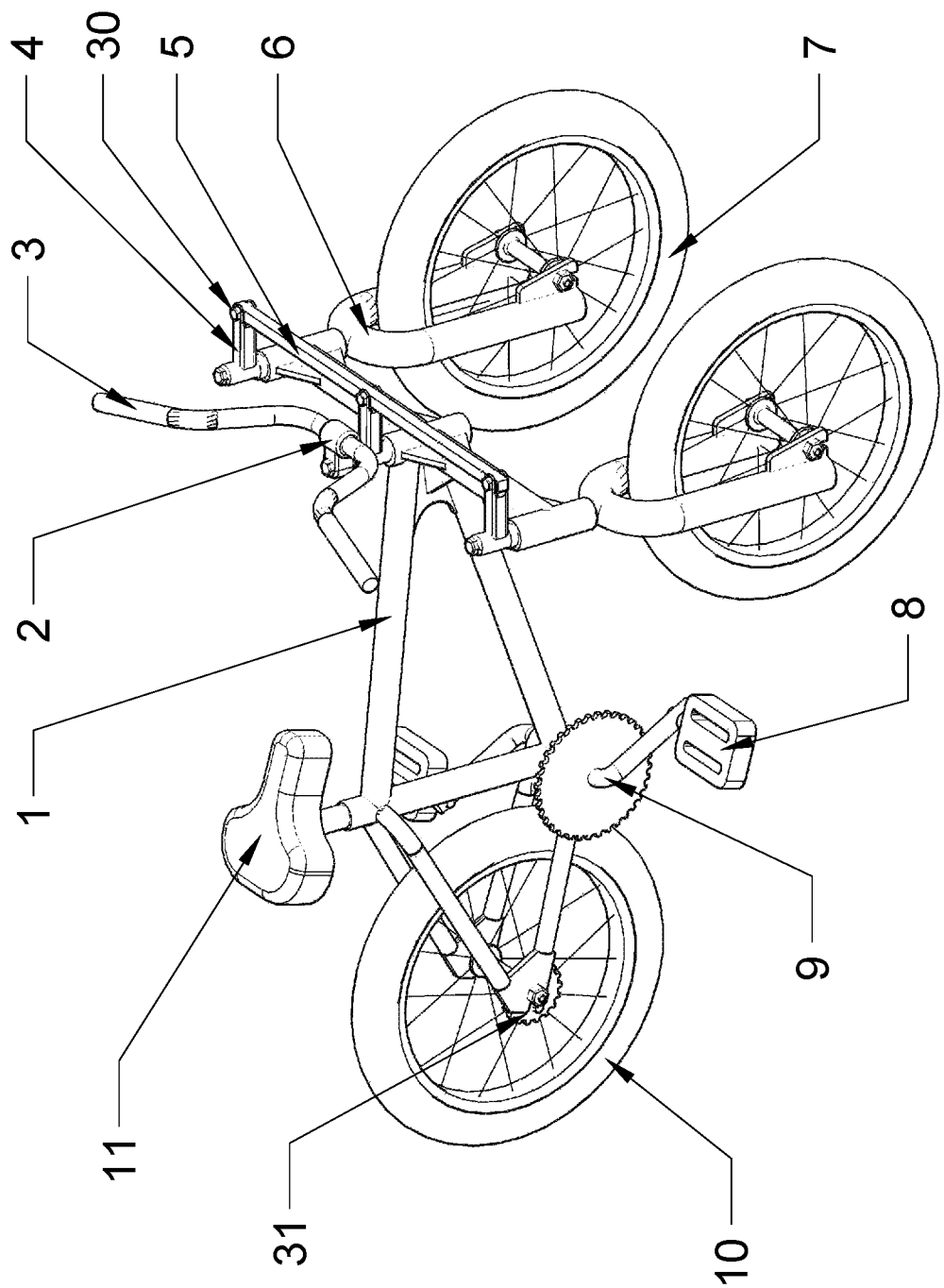
FIG. 1 is a front Isometric View of a three-wheeled human powered vehicle of the present invention.
Figure 2:
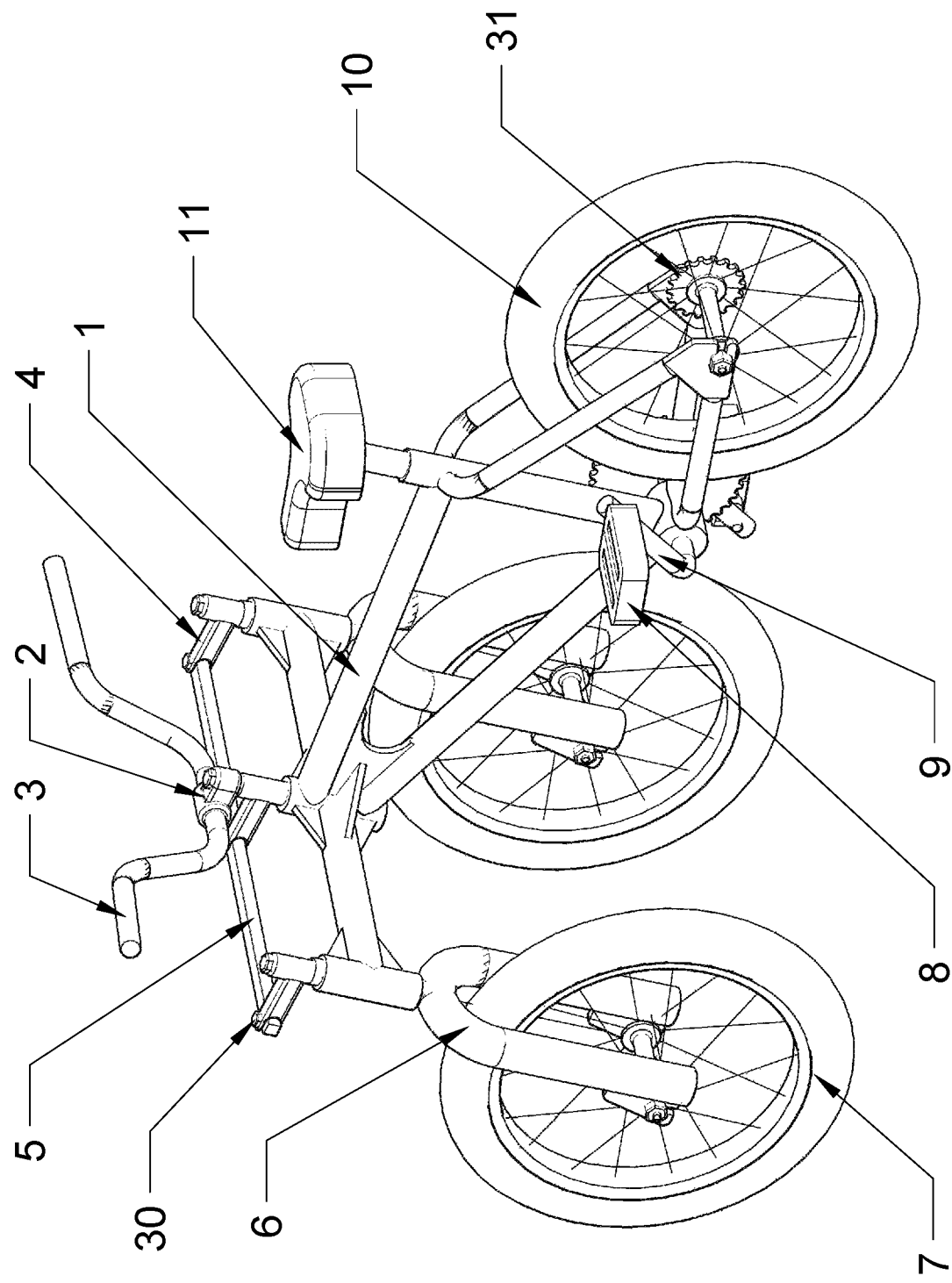
FIG. 2 is a rear Isometric View of a three-wheeled human powered vehicle of the present invention.

Referring now to the invention in more detail, in FIG. 1 and FIG. 2 there is shown front and rear isometric view of the full assembly of a three-wheeled version of the present invention. The vehicle utilizes two Front Wheels (7), which steer the vehicle, one Rear Wheel (10) which drives the vehicle, a novel lightweight Frame Assembly (1), a novel steering system, a mechanical pedal and crank assembly chain transfer system, and a Seat (11). The steering system consists of a Stem/Pitman Arm (2), Handlebars (3), two Steering Arms (4), Steering Shaft (5), two Fork Assemblies (6), and Steering Shaft Pins (30). The mechanical pedal and crank assembly chain transfer system consist of two Pedals (8), Crank Assembly (9), and Rear Drive Gear (31). (Please note: chain not shown for clarity.)

The driver is positioned in an upright position on the Seat (11) similar to that of a standard bicycle. The driver powers the vehicle with his legs utilizing a mechanical pedal and crank assembly transfer system. The mechanical pedal and crank assembly transfer system can utilize a chain, belt, or shaft and be equipped with single ratio, or multiple ratio gearing. The vehicle's braking system function in the same manner as a conventional bicycle.

Figure 3:
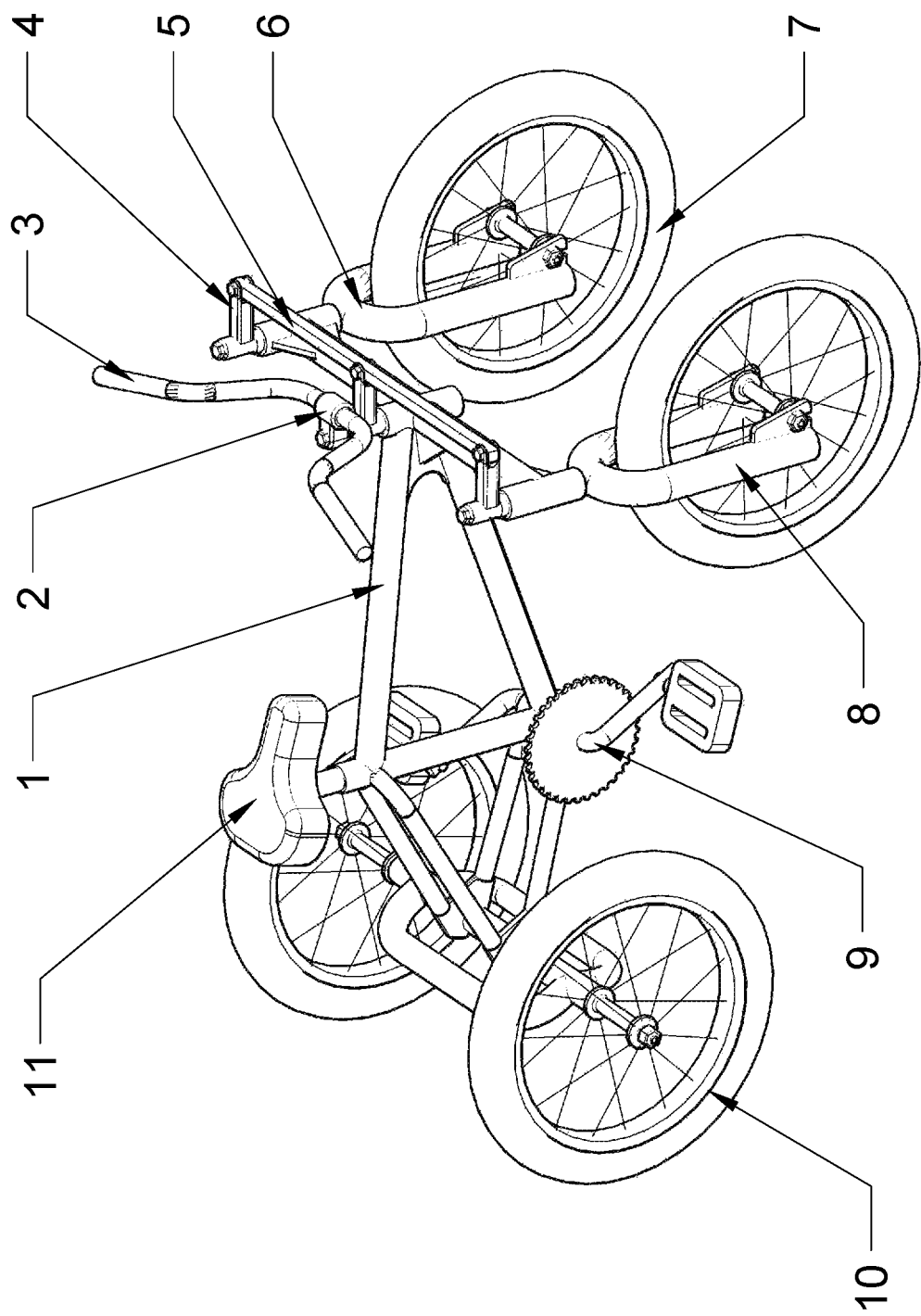
FIG. 3 is a front Isometric View of a four-wheeled human powered vehicle of the present invention.

Referring now to the invention in more detail, in FIG. 3 there is shown a front isometric view of the full assembly of a possible embodiment of the four-wheeled version of the present invention. The components of the four-wheeled version of the present invention are identical to the three-wheeled version as described above except for two Rear Wheels (10).

Figure 4:
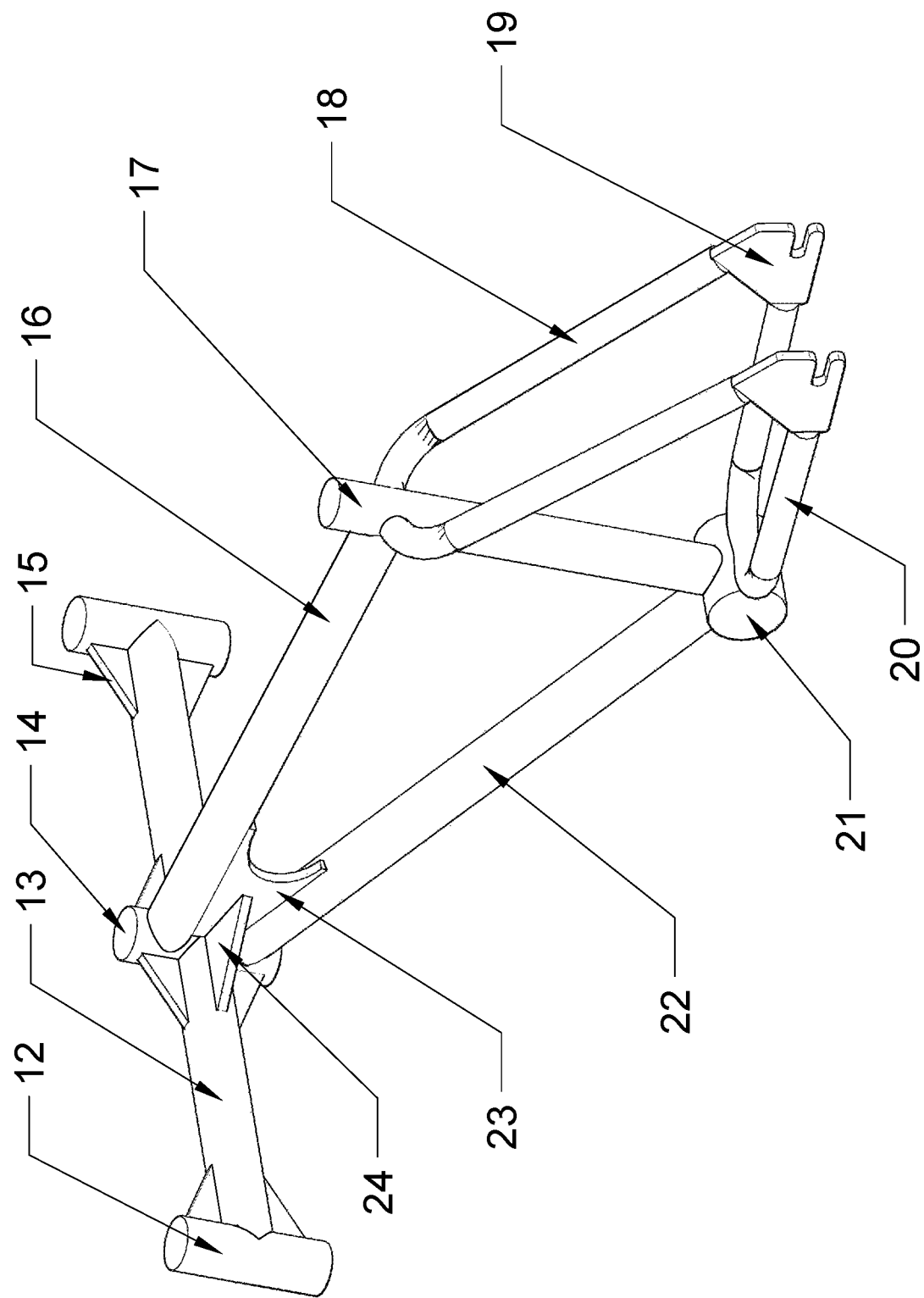
FIG. 4 is a rear Isometric View of the frame assembly of a three-wheeled human powered vehicle of the present invention.

Referring now to the invention in more detail, in FIG. 4 there is shown a rear isometric view of the Frame Assembly of a three-wheeled version of the present invention. The Frame Assembly (1) of the vehicle consists of right and left Outer Head Tubes (12), right and left Cantilever Tubes (13), Center Head Tube (14), eight Head Tube Gussets (15), Top Tube (16), Seat Tube (17), two Seat Stays (18), two Dropouts (19), two Chain Stays (20), Bottom-Bracket Shell (21), Down Tube (22), Yoke (23), and two Cantilever Tube Gussets (24). The Center Head Tube (14), right and left Outer Head Tubes (12), and right and left Cantilever Tubes (13), Head Tube Gussets (15), Cantilever Tube Gussets (24) and Yoke (23) function together to provide the attachment points for the vehicle's two front wheels and steering mechanism. Additional frame strengthening is provided by the Yoke (23) which is suitably secured to the Top Tube (16), Down Tube (22), and Center Head Tube (14). The Cantilever Tubes (13) are provided additional rigidity by the Head Tube Gussets (15) and Cantilever Tube Gussets (24). The Top Tube (16), Seat Tube (17), Seat Stays (18), Dropouts (19), Chain Stays (20), Bottom-Bracket Shell (21), Down Tube (22), and Yoke (23), provide the platform for the vehicle's seating, attachment point for the vehicle's crank assembly, and attachment point for the vehicle's rear wheel much like that of a traditional two wheeled bicycle. In examples of the present disclosure, the yoke (23) is directly attached to the top tube (16). The yoke (23) is directly attached to the down tube (22). The yoke (23) is directly attached to the Center Head Tube (14). The right cantilever tube gusset [right one of the two cantilever gussets (24)] is directly attached to the yoke (23) and right Cantilever Tube (13). The left cantilever tube gusset [left one of the two cantilever gussets (24)] is directly attached to the yoke (23) and left Cantilever Tube (13).

Figure 5:
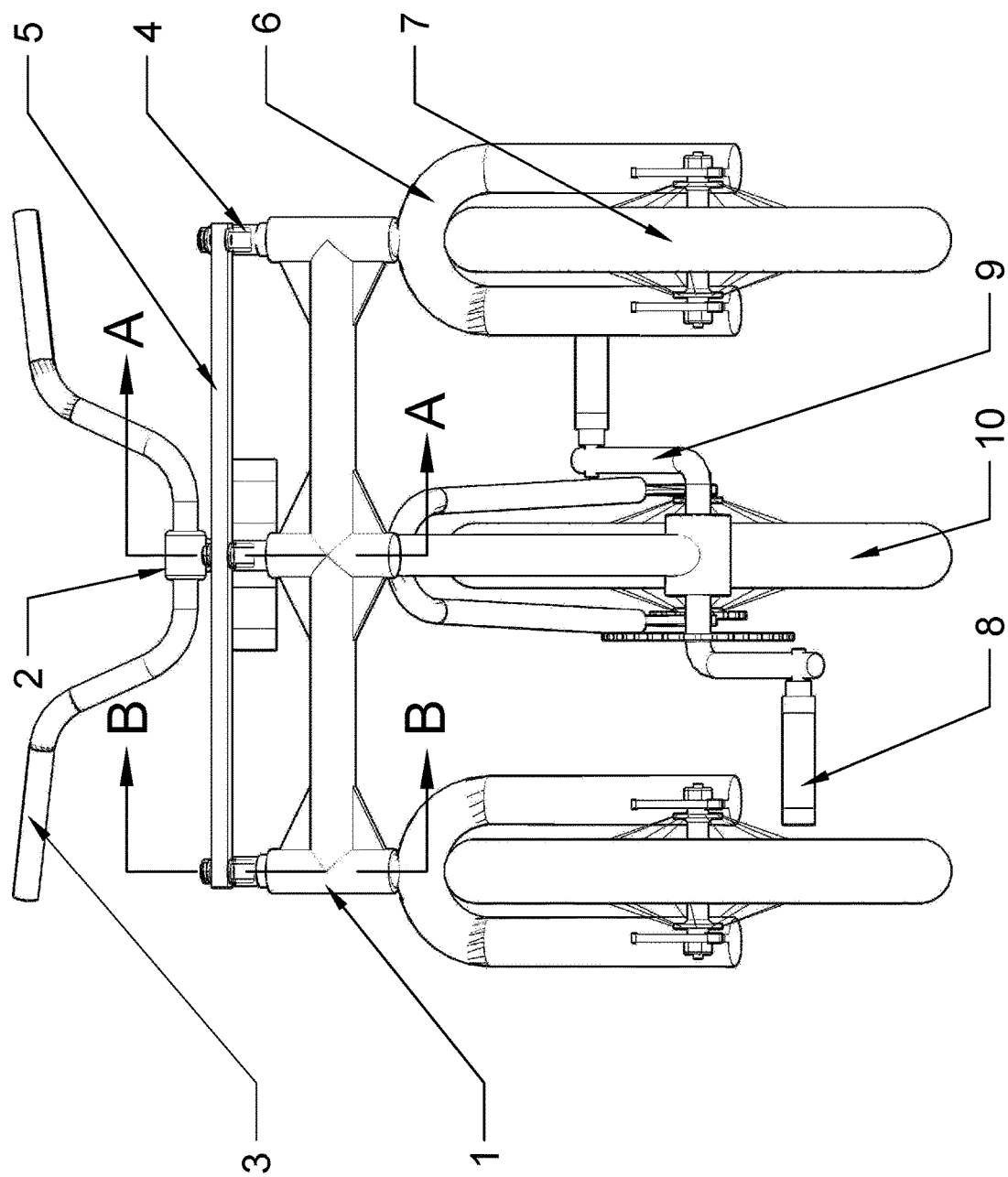
FIG. 5 is a Front View of a three-wheeled human powered vehicle of the present invention.

Referring now to the invention in more detail, in FIG. 5 there is shown front view of the full assembly of a three-wheeled version of the present invention. This view is provided primarily to show the section lines for Section A-A the sectional view of the Center Steering Assembly (32) and Section B-B the sectional view of the Outer Steering Assembly (33).

Figure 6:
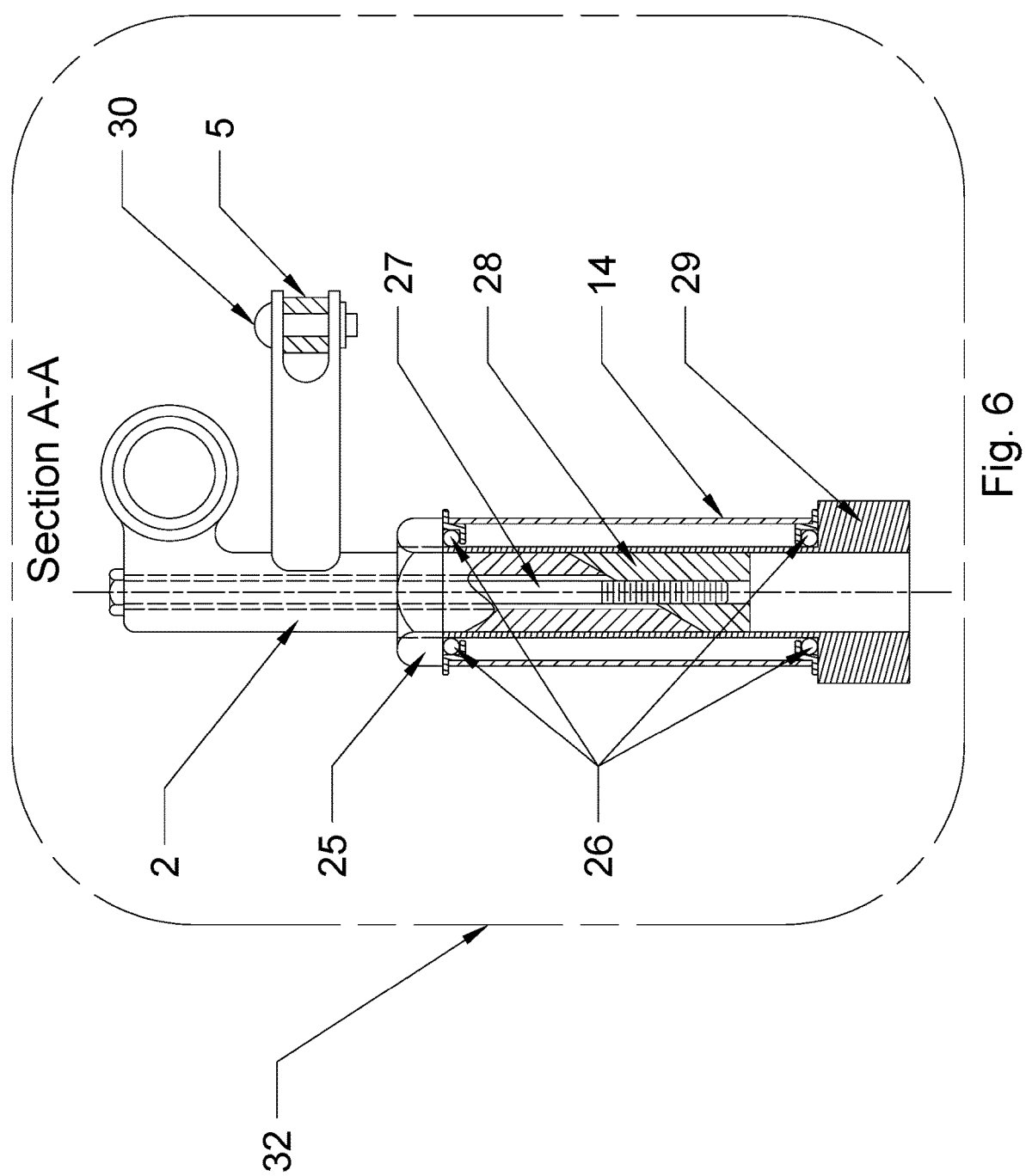
FIG. 6 is a Sectional View of the Center Steering Assembly of the present invention.
Figure 9:
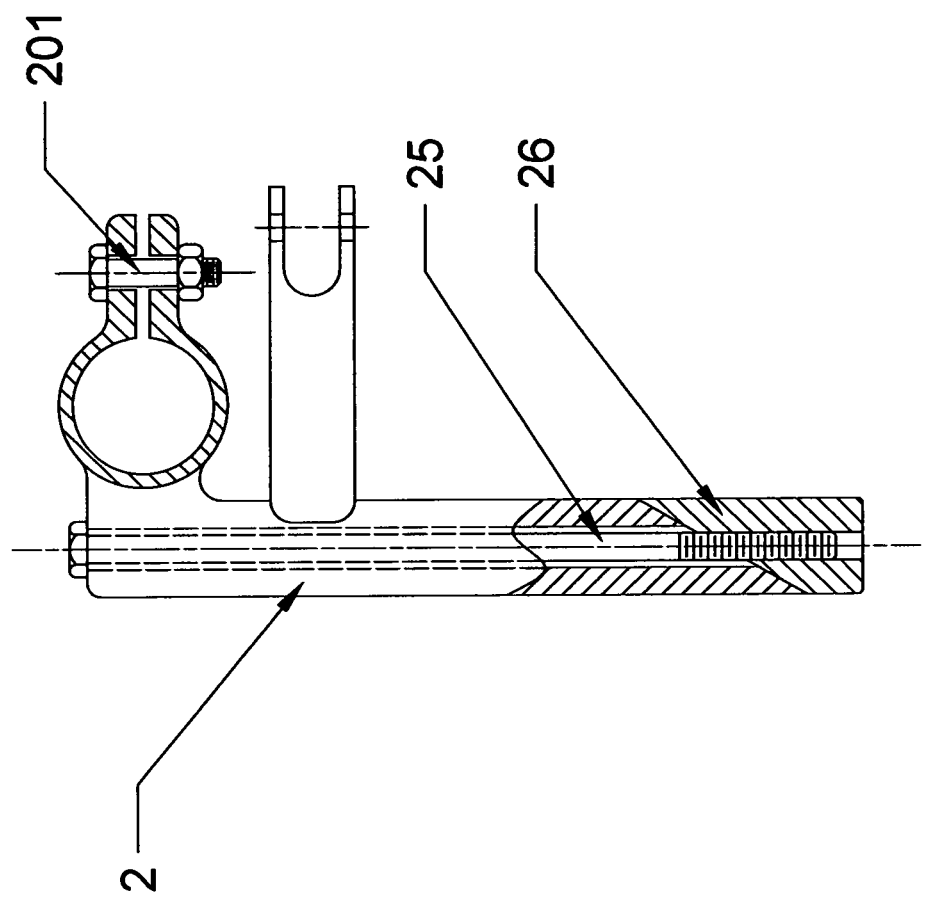
FIG. 9 is a cross sectional view of a pinch bolt in examples of the present disclosure.
Figure 10:
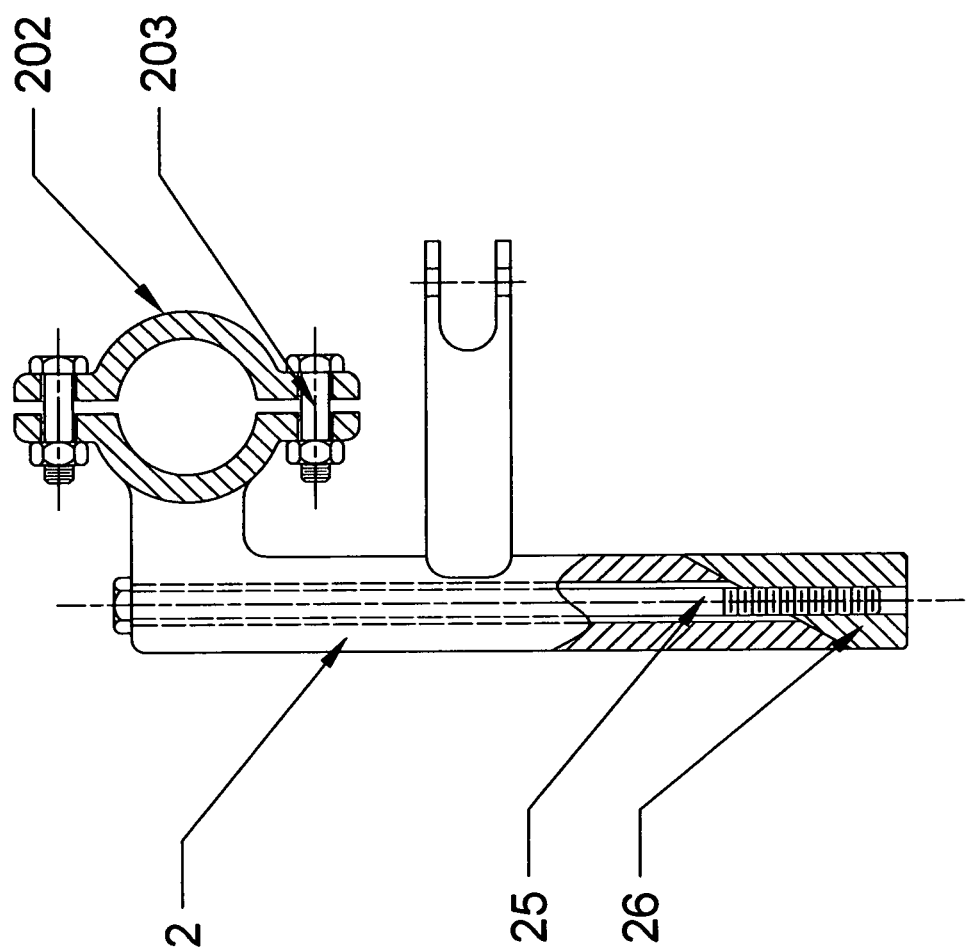
FIG. 10 is a cross sectional view of a pillow block in examples of the present disclosure.

Referring now to the invention in more detail, in FIG. 6 there is shown Section A-A, sectional view of the Center Steering Assembly (32), of the present invention and again to FIG. 1 the front isometric view of the full assembly of the present invention. The Center Steering Assembly (32) consists of Handlebars (3), Stem/Pitman Arm (2), Steerer Tube (29), Steerer Tube Locknut (25), Headset (26), Wedge (28), Wedge Bolt (27), Center Head Tube (14), Steering Shaft (5), and Steering Shaft Pin (30). The Handlebars (3) are attached to the Stem/Pitman Arm (2) via a pinch bolt (pinch nut and bolt 201 of FIG. 9), pillow block (pillow block 202 and pillow block nut and bolt of FIG. 10), and the Stem/Pitman Arm (2) is mounted in the Steerer Tube (29) via a clamp or quill (FIG. 6 shows a quill design with a Wedge (28) and Wedge Bolt (27) type mounting). The Steerer Tube (29) is held in place by Steerer Tube Locknut (25), and rides in the Frame Assembly's (1) Center Head Tube (14) via the Headset (26). The Stem/Pitman Arm (2) is attached to the Steering Shaft (5) via the Steering Shaft Pin (30).

Figure 7:
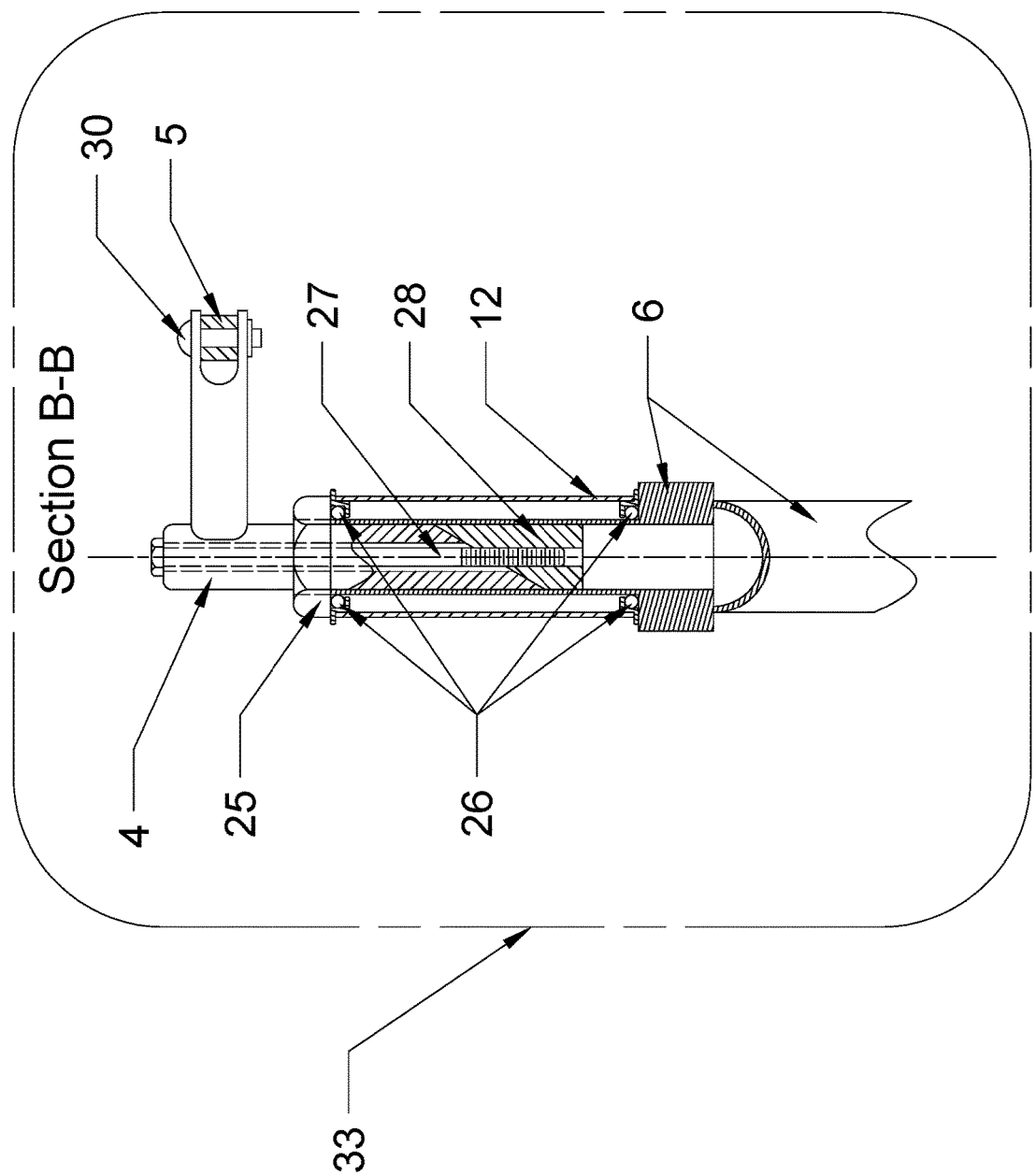
FIG. 7 is a Sectional View of the Outer Steering Assembly of the present invention.

Referring now to the invention in more detail, in FIG. 7, there is shown Section B-B, sectional view of the Outer Steering Assembly (33), of the present invention and again to FIG. 1 the front isometric view of the full assembly of the present invention. The right and left Outer Steering Assembly (33) consists of a Steering Arm (4), a Fork Assembly (6), a Steerer Tube Locknut (25), Headset (26), Wedge (28), Wedge Bolt (27), Outer Head Tube (12), Steering Shaft (5), Steering Shaft Pin (30), and Front Wheel (7). The Steering Shaft (5) is attached to the Steering Arm (4) via the Steering Shaft Pin (30). The Steering Arm (4) is attached to the steerer tube of the Fork Assembly (6) via a clamp or quill (FIG. 7 shows a quill design with a Wedge (28) and Wedge Bolt (27) type mounting). The Fork Assembly (6) is held in place by Steerer Tube Locknut (25), and rides in the Frame Assembly's (1) Outer Head Tube (12) via the Headset (26). The Front Wheel (7) is attached to the Fork Assembly (6). The right and left Outer Steering Assemblies (33) are mounted to the right and left Outer Head Tubes (12) on the Frame Assembly (1) of the vehicle.

Figure 8:
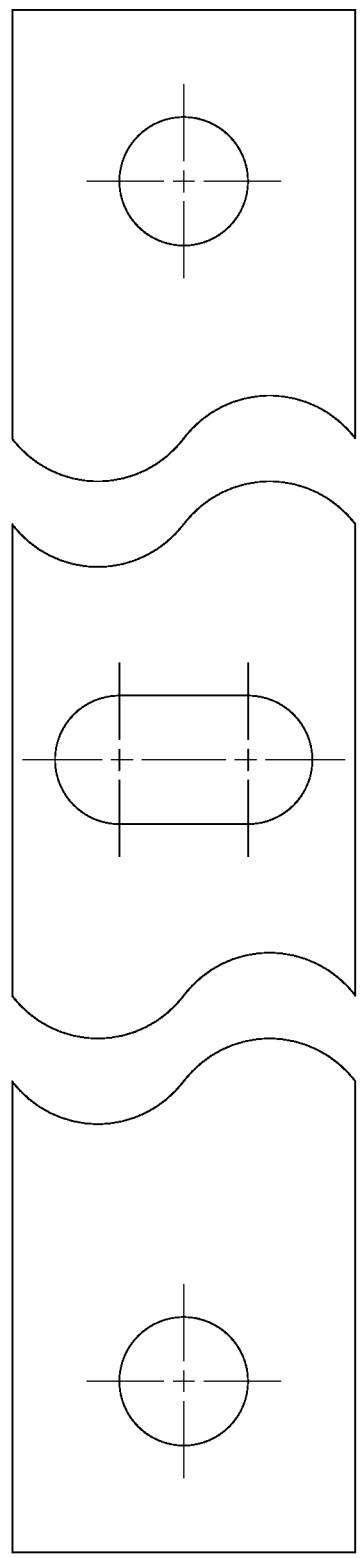
FIG. 8 is a Detail View of the Steering Shaft of the present invention.

Referring now to the invention in more detail, in FIG. 8, there is shown a detail view of the Steering Shaft (5) of the present invention. The outer holes in the Steering Shaft (5) is the attachment point for the Steering Arm (4) via the Steering Shaft Pin (30). The center slot in the Steering Shaft (5) is the attachment point for the Stem/Pitman Arm (2) via the Steering Shaft Pin (30). The center slot allows the Steering Shaft (5) to float between the two Steering Arms (4) without binding against the Stem/Pitman Arm (2). Due to the center slot shape and orientation, the center slot does not induce play to the vehicle's steering system.

Referring again to FIG. 1 and FIG. 2 the front and rear isometric view of the full assembly of the present invention. The driver maneuvers the vehicle by rotating the Handlebars (3) which rotates the Center Steering Assembly (32). The Stem/Pitman Arm (2), which is part of the Center Steering Assembly (32), drives the Steering Shaft (5) in a linear direction. The Steering Shaft (5), in turn, rotates the Steering Arm (4) which is part of the Outer Steering Assembly (33). The Outer Steering Assembly (33) turns the Front Wheel (7).

The vehicle's steering is completely adjustable. Incorporated within the design allows for adjustment of the Front Wheel (7) toe, the alignment between the Handlebars (3) and steering assembly, the alignment between the Steering Arm (4) and Fork Assembly (6), and the Ackermann steering geometry.

Referring again to FIG. 1 and FIG. 2 the front and rear isometric view of the full assembly of the present invention. The driver propels the vehicle by rotating the Crank Assembly (9) which is part of a mechanical pedal, crank and chain transfer system mounted in the Bottom-Bracket Shell (21) of the Frame Assembly (1). The mechanical pedal, crank and chain transfer system drives the Rear Drive Gear (31) of the Rear Wheel(s) (10).

The construction details of the invention as shown in FIGS. 1-8 are such that the vehicle may be made of steel, aluminum, or of any other sufficiently rigid and strong material such as high-strength plastic and the like. Further, the various components of the vehicle can be made of different materials.

The present invention is shown in a manual operating form with a single speed manual drive. However, the present invention can be fitted with any number of multiple speed drive systems such as a derailleur system. Additionally, the present invention can be fitted with a power drive system such as an electric motor or similar device. The present invention can also be fitted with a solar charging system enabling virtually cost free operation.

Advantages of Present Invention

The present invention has many advantages over that of a traditional tricycle and other three or four wheeled human powered vehicles. The present invention eliminate all of the above mentioned operation limitations of traditional tricycle and other three or four wheeled human powered vehicles and adds many additional features that improve the operation of the vehicle.

These advantages the present invention include, without limitation, that:

The present invention utilizes the rear wheel(s) to drive the vehicle which results in negligible loss of traction and wheel slippage. Traditional tricycles and other three-wheeled human powered vehicles typically utilize the front wheel to drive the vehicle. These configurations results in excessive loss of traction and slipping of the drive wheel.

The present invention utilizes two front wheels which is a substantially more stable design than that of a traditional tricycle which are inherently unstable during turns.

The crank assembly of the present invention is fixed within the frame assembly of the vehicle and positioned at the most efficient and comfortable location for the driver. The crank assembly of a traditional tricycle is attached to the front wheel that steers the vehicle. When a traditional tricycle is turned the crank assembly and pedals are also turned resulting in an inefficient pedal position.

The present invention is more ergonomically efficient than that of a traditional tricycle or other three or four wheeled human powered vehicles because it positions the driver over the crank assembly in an upright position allowing virtually all of the driver's energy to be used to propel the vehicle. A traditional tricycle and other three or four wheeled human powered vehicles position the driver in a seated or semi-seated position with the legs of the driver in front of the driver's hips and torso. A seated or semi-seated position does not allow the driver to efficiently apply force to the pedals of the vehicle. The driver must hold himself into position, rely on his body weight or utilize a seat back to counter the force he applies to the pedals.

The present invention allows for easy application of multiple gear ratio drive mechanisms. A traditional tricycle would require a complex device to incorporate a multiple gear ratio drive mechanism.

Due to a stable three or four wheel platform and the driver's upright position, the present invention allows the driver to have more self-confidence and mechanical stability when stopped or driving slowly, driving with a load, driving while towing, driving with a passenger, or driving in a highly congested area.

Due to a stable three or four wheel platform and the driver's upright position, the present invention allows for easy mounting and dismounting of the vehicle. Other three or four wheeled human powered vehicles position the driver close to the ground and/or in a seated or semi-seated position with the legs of the driver in front of the driver's hips and torso, thus making it difficult to mount and dismount the vehicle.

The present invention incorporates a steering system that is completely adjustable. Within the design there are allowances for adjustment of handlebars in relationship to the steering assembly, the front wheel toe, the alignment between the steering arm and forks, and the Ackermann steering geometry.

The present invention allows for easy incorporation of electric or other type of power drive system. The configuration of traditional tricycles and other three or four wheeled human powered vehicles make it difficult to fit them with power drive systems.

The present invention utilizes components that are easily adapted for use by the handicapped. The configuration of traditional tricycles and other three or four wheeled human powered vehicles make it difficult or impossible be adapted for use by the handicapped.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

I claim:

1. A three or four wheeled human powered vehicle comprising:
   a dual wheel front steering assembly;
   a single or dual wheel rear drive; and
   a frame assembly comprising:
      a right outer head tube;
      a left outer head tube;
      a right cantilever tube;
      a left cantilever tube;
      a center head tube;
      a plurality of head tube gussets;
      a top tube;
      a seat tube;
      two seat stays;
      two dropouts;
      two chain stays;
      a bottom-bracket shell;
      a down tube;
      a yoke;
      a right cantilever tube gusset; and
      a left cantilever tube gusset;
   wherein the right outer head tube is connected to the center head tube via the right cantilever tube;
   wherein the left outer head tube is connected to the center head tube via the left cantilever tube;
   wherein the frame assembly is gusseted for strength by the plurality of head tube gussets and the yoke;
   wherein the yoke is directly attached to the top tube;
   wherein the yoke is directly attached to the down tube;
   wherein the yoke is directly attached to the center head tube;
   wherein the right cantilever tube gusset is directly attached to the yoke and the right cantilever tube; and
   wherein the left cantilever tube gusset is directly attached to the yoke and the left cantilever tube.

2. The three or four wheeled human powered vehicle as recited in claim 1,
   wherein the dual wheel front steering assembly comprises:
      a center steering assembly comprising:
         a steerer tube mounted on the center head tube of the frame assembly;
         a stem Pitman arm secured to the steerer tube via a clamp or a quill; and
         a handle bar attached to the stem Pitman arm via a pinch bolt or a pillow block.

3. The three or four wheeled human powered vehicle as recited in claim 2,
   wherein the dual wheel front steering assembly further comprises:
      a right outer steering assembly comprising:

a right fork assembly mounted on the right outer head tube of the frame assembly via a right headset and a right steer tube locknut; and a right steering arm secured to the right fork assembly via a right clamp or a right quill; and a left outer steering assembly comprising:

a left fork assembly mounted on the left outer head tube of the frame assembly via a left headset and a left steer tube locknut; and a left steering arm secured to the left fork assembly via a left clamp or a left quill;

wherein a right front wheel is attached to the right fork assembly; and wherein a left front wheel is attached to the left fork assembly.

4. The three or four wheeled human powered vehicle as recited in claim 3, wherein the dual wheel front steering assembly still further comprises an anti-binding steering shaft connecting the stem Pitman arm of the center steering assembly to the right steering arm of the right outer steering assembly and connecting the stem Pitman arm of the center steering assembly to the left steering arm of the left outer steering assembly.

5. The three or four wheeled human powered vehicle as recited in claim 4, further comprising:

a mechanical pedal, crank and chain transfer system mounted on the bottom-bracket shell of the frame assembly;

wherein the mechanical pedal, crank and chain transfer system drives a rear drive gear of a single rear wheel or drives another rear drive gear attached to a right single rear wheel and a left single rear wheel via an axle.

6. The three or four wheeled human powered vehicle as recited in claim 4, wherein a weight and a strength of the frame assembly of the three or four wheeled human powered vehicle is configured to allow a driver to sit in an upright position for increased ergonomic efficiency and reduced propulsion effort.

7. The three or four wheeled human powered vehicle as recited in claim 4, wherein a position of a right front wheel toe is adjustable;

wherein a position of a left front wheel toe is adjustable;

wherein an alignment between the right steering arm and the right fork assembly is adjustable;

wherein an alignment between the left steering arm and the left fork assembly is adjustable;

wherein an alignment between the handle bar and the right outer steering assembly is adjustable; and wherein an alignment between the handle bar and the left outer steering assembly is adjustable.

8. The three or four wheeled human powered vehicle as recited in claim 4, wherein the dual wheel front steering assembly incorporates an Ackermann steering geometry so as to reduce wheel turning scrub and preserve forward momentum.

9. The three or four wheeled human powered vehicle as recited in claim 4, further comprising:

a multiple gear ratio drive mechanism; and a power drive system including an electric motor.

10. The three or four wheeled human powered vehicle as recited in claim 4, wherein the three or four wheeled human powered vehicle is adapted to be used by a handicapped person.

11. The three or four wheeled human powered vehicle as recited in claim 4, wherein the three or four wheeled human powered vehicle is configured to be used by a child, an elderly person, or a handicapped person.

12. The three or four wheeled human powered vehicle as recited in claim 4, wherein the anti-binding steering shaft comprises a right outer hole receiving the right steering arm;

a center slot receiving the stem Pitman arm; and a left outer hole receiving the left steering arm;

wherein a shape of a rectangle with two end half circles of the center slot allows the anti-binding steering shaft to float against the stem Pitman arm and does not induce play to the dual wheel front steering assembly.

\* \* \* \* \*